United States Patent [19]

Sau

[11] Patent Number: 4,904,772
[45] Date of Patent: Feb. 27, 1990

[54] MIXED HYDROPHOBE POLYMERS
[75] Inventor: Arjun C. Sau, Newark, Del.
[73] Assignee: Aqualon Company, Wilmington, Del.
[21] Appl. No.: 252,315
[22] Filed: Oct. 3, 1988
[51] Int. Cl.[4] .......................................... C08B 11/193
[52] U.S. Cl. .......................................... 536/90; 536/91
[58] Field of Search ....................... 536/50, 56, 58, 63, 536/66, 76, 80–85, 88, 90, 91

[56] References Cited

U.S. PATENT DOCUMENTS

| | | | |
|---|---|---|---|
| 4,228,277 | 3/1980 | Landoll | 536/91 |
| 4,352,916 | 11/1979 | Landoll | 526/201 |
| 4,663,159 | 5/1987 | Brode et al. | 424/70 |

FOREIGN PATENT DOCUMENTS 0281360  7/1988  European Pat. Off. .

*Primary Examiner*—John Kight
*Assistant Examiner*—Carlos Azpuru
*Attorney, Agent, or Firm*—Mark D. Kuller

[57] ABSTRACT

Water-soluble, cellulose ether polymers having (a) at least one substituent selected from the group consisting of hydroxyethyl, hydroxypropyl, and methyl radicals and (b) two or more hydrophobic radicals having 6 to 20 carbon atoms selected from the group consisting of long chain alkyl, alphahydroxyalkyl, urethane, acyl and 3-alkoxy-2-hydroxypropyl, wherein one of the hydrophobic radicals has a carbon chain length that is at least two carbon atoms longer than that of the other of the hydrophobic radials and the hydrophobic radicals are contained in a total amount of between about 0.2 weight percent and an amount such that the cellulose ethers are less than 1% by weight soluble in water, and aqueous protective coatings, such as latex paints, containing the same are disclosed.

23 Claims, No Drawings

MIXED HYDROPHOBE POLYMERS

This invention relates to new water-soluble cellulose derivatives and new aqueous solutions containing the same. More specifically, it relates to water-soluble, cellulose ether polymers having (a) at least one substituent selected from the group consisting of hydroxyethyl, hydroxypropyl, and methyl radicals and (b) two or more hydrophobic radicals having 6 to 20 carbon atoms selected from the group consisting of long chain alkyl, alphahydroxyalkyl, urethane, acyl and 3-alkoxy-2-hydroxypropyl, wherein one of the hydrophobic radicals has a carbon chain length that is at least two carbon atoms longer than that of the other hydrophobic radical. In another embodiment, it relates to aqueous protective coatings, such as latex paints containing the aforesaid modified cellulose derivatives.

BACKGROUND OF THE INVENTION

Landoll, in U.S. Pat. No. 4,228,277, discloses water-soluble cellulose ether polymers substituted with (a) a methyl, hydroxyethyl or hydroxypropyl radical and (b) a $C_{10}$ to $C_{24}$ long chain alkyl group (hydrophobe). Landoll, in U.S. Pat. No. 4,352,916, discloses modifying such cellulose ethers with hydrophobes having 6 to 25 carbon atoms.

Landoll does not discuss using hydrophobes of different lengths in combination (mixed hydrophobes) or the advantages thereof. All of the examples shown therein are directed to cellulose ethers modified with chains having a uniform length, except those used in examples 7 to 10 of U.S. Pat. No. 4,228,277 and example 4 of U.S. Pat. No. 4,352,916 wherein epoxides having 20 to 24 carbon atoms were used. Therein, epoxides having 20 to 24 carbon atoms were used because it is difficult and expensive to separate compounds having longer carbon chains.

The cellulose ethers of Landoll are used as thickeners in, among other things, latex paints. The water-solubility and paint rheological properties of these polymers are primarily dictated by the size and amount of the hydrophobe. For instance, a hydroxyethylcellulose derivative having a long alkyl chain hydrophobe (chain length of 12 or more) exhibits very high aqueous viscosity at a much lower alkyl content than its shorter alkyl chain (less than 8 carbon atoms) containing counterparts. However, similar polymers having long alkyl chains become water-insoluble at a lower level of alkyl substitution. This insolubility severely restricts their usefulness in situations where a higher hydrophobe level is best suited to achieve the desired performance properties, as for instance, improved color development and spatter resistance in paint. Hence, there has been a desire to develop cellulose polymers having such hydrophobes that provide enhanced viscosity and desired rheological properties, without being insoluble, in water.

Recently, nonionic cellulose ether polymers having (a) at least one substituent selected from the group consisting of hydroxyethyl, hydroxypropyl and methyl radicals and (b) a 3-alkoxy-2-hydroxypropyl group wherein the alkyl moiety is a straight chain alkyl group having 2 to 24 carbon atoms have been studied. They are described by t'Sas in U.S. patent application No. 07/063,568 (Filed June 17, 1987) now allowed and given U.S. Pat. No. 4,845,207 and Angerer in U.S. patent application No. 07/223,577 (Filed July 25, 1988), now allowed. Polymers comprising short chain groups, e.g., having 2 to 8 carbon atoms, have been found to be useful in building applications. Those containing longer chain groups, i.e., 6 to 24 carbon atoms, have been found to be especially useful in protective coating solutions, e.g., latex paints. These polymers also suffer from the insolubility problem referred to with respect to the polymers of Landoll.

The inventor was the first to study cellulose ethers having two or more hydrophobes of varied length and has discovered the enhanced rheological properties and improved control obtained with such polymers.

SUMMARY OF THE INVENTION

Accordingly, this invention is directed to water-soluble, cellulose ether polymers having (a) at least one substituent selected from the group consisting of hydroxyethyl, hydroxypropyl, and methyl radicals and (b) two or more hydrophobic radicals having 6 to 20 carbon atoms selected from the group consisting of long chain alkyl, alphahydroxyalkyl, urethane, acyl and 3-alkoxy-2-hydroxypropyl, wherein one of the hydrophobic radicals has a carbon chain length that is at least two carbon atoms longer than that of the another of the hydrophobic radicals and the hydrophobic radicals are contained in a total amount of between about 0.2 weight percent and an amount such that the cellulose ethers are less than 1% by weight soluble in water, and aqueous protective coatings, such as latex paints, containing the same.

DETAILED DESCRIPTION OF THE INVENTION

The polymers of this invention are substantially completely soluble in water at ambient temperature. They can be prepared directly from cellulose or from cellulose ether derivatives, such as hydroxyethylcellulose.

Chemical cotton, wood pulp and other sources of cellulose that are useful in the manufacture of the polymers of this invention (as well as the aforementioned polymers) are readily available.

The polymers of this invention can be prepared from any of the well known cellulose ether derivatives, provided that the polymer has a reasonably accessible reactive hydroxyl group. Preferred polymers are anionic or nonionic, with the latter being more preferred. Such polymers include hydroxyethylcellulose, hydroxypropylcellulose, methylcellulose, hydroxypropylmethylcellulose (also known as methylhydroxypropylcellulose), methylhydroxyethylcellulose (also known as hydroxyethylmethylcellulose), ethylhydroxyethylcellulose, hydroxypropylhydroxyethylcellulose, carboxymethylhydroxyethylcellulose, hydroxybutylhydroxyethylcellulose and their derivatives. Commercially available materials which can be used to prepare the polymers of this invention include those available under the trademarks Natrosol and Klucel, by Aqualon Company, Wilmington, Del., Culminal by Aqualon Company and Aqualon GmbH & Co. KG, Dusseldorf, Federal Republic of Germany, Blanose by Aqualon France BV, Alizay, France, and Methocel, by Dow Chemical Company, Midland, Mich.

Preferred are polymers containing hydroxyethyl and hydroxypropyl groups. In a more preferred polymer per this invention the substituent (a) is hydroxyethyl, and the cellulose ether derivative is nonionic and has a hydroxyethyl molar substitution (M.S.) (number of moles of substituent per cellulosic anhydroglucose unit in the cellulose molecule) of about 1.0 to 4.5. Most preferably the polymer has a viscosity in the range of about 5 to about 60,000 centipoise (cps) in a 1 weight % solution using a Brookfield Synchro-Lectric Model LVF Viscometer at 6 rpm (Brookfield LVF Viscosity).

The hydrophobic groups of this invention include long chain alkyl groups derived from alkyl halides, alphahydroxyalkyl radicals derived from epoxides, urethane radicals derived from isocyanates, acyl radicals derived from acids or acyl chlorides, and 3-alkoxy-2-hydroxypropyl radicals derived from alkylglycidyl ethers. Preferred are hydrophobic groups derived from alkyl bromides and 3-alkoxy-2-hydroxypropyl radicals.

In some instances, the hydrophobic radicals are not entirely comprised of the same number of carbon atoms. For instance, alkyl glycidyl ethers used to prepare 3-alkoxy-2-hydroxy-propyl polymers are available as, e.g., $C_{12-13}$ and $C_{15-16}$ alkyl glycidyl ethers. Herein, such radicals are not considered hydrophobic groups having a different number of carbon atoms.

Methods of preparing mixed ethers of cellulose, i.e., products having more than one etherifying modifier attached to the same cellulose chain are known to the art. The products of this invention can be prepared via essentially the same methods. For example, the preferred procedure for preparing a polymer using alkyl bromides comprises alkylyzation of cellulose in a mixture of t-butyl alcohol, isopropyl alcohol, acetone, water and sodium hydroxide in a nitrogen atmosphere for a period of time that is sufficient to distribute the alkali onto the cellulose. Then, ethylene oxide is added to the alkali cellulose slurry, followed by heating at 70° C. for 1 hour. The resulting slurry is partially neutralized and additional ethylene oxide is added to the reaction mixture. Then, the resulting reaction mixture is heated at 90°-95° C. for 90 minutes. Caustic and alkyl bromides (two different alkyl bromides, one having at least two more carbon atoms than the other) are added, followed by heating of the reaction mixture at 115° C. for 2 hours and neutralization of the reaction mixture. The resultant polymer is then purified by washing the reaction mixture.

Polymers containing a 3-alkoxy-2-hydroxypropyl radical can be prepared in a similar manner. Briefly, modification can be effected by slurrying a polymer, such as hydroxyethylcellulose, in an inert organic diluent such as a lower aliphatic alcohol, ketone, or hydrocarbon and adding a solution of alkali metal hydroxide to the resultant slurry at low temperature. When the ether is thoroughly wetted and swollen by the alkali, the alkylglycidyl ether is added and the reaction is continued with agitation and heating until complete. Residual alkali is then neutralized and the product is recovered, washed with inert diluents, and dried.

The polymers of this invention can also be prepared directly from cellulose. For instance, polymers containing 3-alkoxy-2-hydroxypropyl and hydroxyethyl radicals can be prepared by first adding chemical cotton to a mixture of an inert organic diluent and alkali metal hydroxide. Then, ethylene oxide or another substituent is added to the resultant alkali cellulose and once the reaction is completed the product is treated with nitric acid. To this reaction mixture is added the alkyl glycidyl ethers and, optionally, a second increment of ethylene oxide. After the reaction is complete, the product is then neutralized, filtered, washed with aqueous inert diluents and dried.

Since mixed hydrophobe polymers generally contain a short chain hydrophobe in place of some of a longer chain hydrophobe, their formation is more efficient and, therefore, more economical.

Preparation of modified cellulose ethers per this invention is demonstrated in the following preparation examples, which are illustrative and not intended to be limiting. Therein, and throughout this specification, all percentages, parts, etc., are by weight unless otherwise indicated.

PREPARATION EXAMPLE 1

This example shows preparation of $C_8/C_{16}$ mixed hydrophobe hydroxyethylcellulose.

A solution of sodium hydroxide (25.6 parts) in water (86.5 parts) was prepared and added under nitrogen to a well agitated slurry of cellulose (Grade 502, 84 parts "as is") in a mixture of t-butyl alcohol (640 parts), acetone (35.2 parts) and isopropanol (28 parts) in a Chemco reactor over a period of 10 minutes. The resulting mixture was vigorously mixed at 24° C. for 45 minutes. Then ethylene oxide (27.3 parts) was added to the alkali cellulose slurry. After heating at 70° C. for 1 hour, the reaction mixture was cooled to 60° C. and treated with 70% nitric acid (48 parts). The partially neutralized reaction mixture was cooled to 40° C. Then additional ethylene oxide (70.6 parts) was added to the mixture and the mixture was heated with agitation to 90°-95° C. and held for 1.5 hours.

Subsequently, a solution of sodium hydroxide (20.8 parts) in water (20.8 parts) was added to the hydroxyethylcellulose reaction mixture at 90°-95° C. over a period of 5 minutes. Then, a mixture of octyl and cetyl bromide (5 parts each) was added over a period of 5 minutes. The resulting reaction mixture was heated at 115° C. for 2 hours. Then, it was cooled to 55° C. and neutralized with 70% nitric acid (53 parts). The resultant product was purified by repeatedly washing the crude polymer with 80:20 acetone/water mixture. After purification, the polymer was dried in a fluid bed dryer at 50°-60° C. The resulting product had a hydroxyethyl M.S. of 3.2, 0.95% of a $C_8$ hydrophobe and 0.35% of a $C_{16}$ hydrophobe, both by weight of the total polymer, and a 1% Brookfield viscosity at 30 rpm of 310 cps.

PREPARATION EXAMPLE 2

This example shows preparation of $C_{12}/C_{16}$ mixed hydrophobe hydroxyethylcellulose.

A hydroxyethylcellulose reaction mixture was prepared as described in Preparation Example 1. Then, a solution of sodium hydroxide (20.8 parts) in water (20.8 parts) was added to the mixture at 90°-95° C. over a period of 5 minutes followed by the addition of a mixture of lauryl and cetyl bromide (5 parts each). The resulting reaction mixture was cooled to 55° C., neutralized with 70% nitric acid (53 parts), and purified and dried as described in Preparation Example 1. The resulting product had a hydroxyethyl M.S. of 3.2, 0.6% of a $C_{12}$ hydrophobe and 0.3% of a $C_{16}$ hydrophobe, both by weight of the total polymer, and a 1% Brookfield viscosity at 30 rpm of 400 cps.

PREPARATION EXAMPLE 3

This example shows preparation of $C_8/C_{12}$ mixed hydrophobe hydroxyethylcellulose.

To a mixture of t-butyl alcohol (689 parts), acetone (24 parts) and a solution of sodium hydroxide (27.4 parts) in water (100 parts) was added chemical cotton (Grade 337, 84 parts "as is"). The resulting mixture was vigorously stirred at 24° C. for 45 minutes. Then ethylene oxide (27.3 parts) was added to the alkali cellulose. After heating at 70° C. for 1 hour, the reaction mixture was cooled to 60° C. and treated with 70% nitric acid (48 parts). The partially neutralized reaction mixture was cooled to 40° C. To this reaction mixture was added more ethylene oxide (70.3 parts). The resulting reaction mixture was heated at 95° C. for 1.5 hours to form a hydroxyethylcellulose precursor.

To the above reaction mixture containing hydroxyethylcellulose at 95° C. was added a 50% solution of sodium hydroxide (38.6 parts) in water over a period of 5 minutes, followed by the addition of a mixture of octyl (4 parts) and lauryl (5 parts) bromide. The resulting mixture was heated at 115° C. for 2 hours. Then, the reaction mixture was cooled to 55° C. and neutralized with 70% nitric acid (50 parts). The crude polymer was purified by washing with a 80:20 acetone/water mixture. The resulting product was analyzed and found to have the following properties: H.E.M.S. 3.4, $C_8$ hydrophobe D.S. 0.014 (0.52 wt. %, based on the weight of the polymer), $C_{12}$ hydrophobe D.S. 0.014 (0.74 wt. %, based on the weight of the polymer), and Brookfield viscosity (1% solution at 30 rpm) of 270 cps.

PREPARATION EXAMPLE 4

This example shows preparation of $C_7/C_{15-16}$ 3-alkoxy-2-hydroxypropylhydroxyethylcellulose (here, the alkyl groups have 4, 12 and 13 carbon atoms and the propyl group accounts for the 3 other carbon atoms in the hydrophobes).

To a mixture of 689 parts t-butyl alcohol, 24 parts acetone and a solution of 27.4 parts sodium hydroxide in 100 parts water was added chemical cotton (Grade 337, 84 parts "as is"). The resulting mixture was vigorously stirred at 24° C. for 45 minutes. Then, 27.3 parts ethylene oxide was added to the alkali cellulose. After heating at 70° C. for 1 hour, the reaction mixture was cooled to 55° C. and treated with 48 parts 70% nitric acid. To this reaction mixture was added a second increment of 70.3 parts ethylene oxide, 12 parts of a $C_{12-13}$ alkyl glycidyl ether (available under the registered trademark Heloxy WC-9, from the Wilmington Chemical Corporation, Wilmington, Del. and 12 parts of n-butyl glycidyl ether (available from Aldrich Chemical Company, Inc., Milwaukee, Wis.). The resulting reaction mixture was heated at 95° C. for 90 minutes and then 115° C. for 2 hours. After cooling the reaction mixture to room temperature, it was neutralized with 10 parts 70% nitric acid. Next, the reaction mixture was filtered and the filtered cake was washed several times with 80:20 acetone/water mixture to remove salts and other by-products. The resultant polymer was characterized as $C_7/C_{15-16}$ 3-alkoxy-2-hydroxypropylhydroxyethylcellulose having a 1% Brookfield viscosity at 30 rpm of 520 cps and a cloud point (15% NaCl solution) of 25° C.

In another embodiment of this invention, the cellulose ether of this invention is further substituted with a third long chain alkyl radical having 6 to 20 carbon atoms, having a different carbon chain length than the other two long chain alkyl radicals. Exemplary is hydroxyethylcellulose having $C_8$, $C_{12}$ and $C_{16}$ long chain alkyl groups, such as that shown in the following example, which is not intended to be limiting.

PREPARATION EXAMPLE 5

This example shows preparation of a $C_8/C_{12}/C_{16}$ mixed hydrophobe hydroxyethylcellulose.

The procedures of Preparation Example 3 were repeated with addition of cetyl bromide (1 part) at the time of addition of octyl and lauryl bromide. The resulting product had a H.E.M.S. of approximately 3.4, $C_8$ hydrophobe D.S. of 0.015 (0.54 wt. %, based on the weight of the polymer), $C_{12}$ hydrophobe D.S. of 0.011 (0.62 wt. %, based on the weight of the polymer), $C_{16}$ hydrophobe D.S. of 0.003 (0.2 wt. %, based on the weight of the polymer) and Brookfield viscosity (1% solution at 30 rpm) of 380 cps.

PREPARATION EXAMPLE 6

This example shows preparation of a $C_8/C_{12}/C_{16}$ mixed hydrophobe hydroxyethylcellulose.

The procedures of Preparation Example 6 were repeated with addition of DOWFAX ® 2Al anionic alkylated $C_{12}$) diphenyl oxide disulfonated surfactant (Dow Chemical Company, Midland, Mich.) (5 parts) along with the alkyl bromides and heating the resulting reaction mixture at 115° C. for 1.5 hours. The resulting product had a H.E.M.S. of 3.5, a $C_8$ hydrophobe D.S. of 0.38 (0.38 wt. %, based on the weight of the polymer), a $C_{12}$ hydrophobe D.S. of 0.01 (0.52 weight %, based on the weight of the polymer), a $C_{16}$ hydrophobe D.S. of 0.002 (0.14 weight %, based on the weight of the polymer) and a Brookfield viscosity (1% solution at 30 rpm) of 150 cps.

The cellulose ethers of this invention are useful as viscosifiers for, among other things, latex paints. The amount of each of the hydrophobes having a different number of carbon atoms per this invention is dependent on the length of the backbone of the cellulosic derivative, the degree or molar substitution of the hydroxyethyl, hydroxypropyl and/or methyl substituent (e.g., the hydroxyethyl molar substitution), the carbon number of each of the hydrophobes, the composition of and desired viscosity of the product in which it is intended to be used, etc. Generally, the weight ratio of the long chain alkyl radicals will fall in the range of about 1:20 to 20:1. While a two carbon atom difference may be satisfactory to achieve the desired product in some instances, in other instances a three, four or greater carbon atom difference may be preferred.

When alkyl bromide substituted polymers are compared, best latex paint performance properties occur with hydroxyethylcellulose having 0.85 to 1.0 wt. % $C_8$ hydrophobe, 0.35 to 0.40 wt. % $C_{16}$ hydrophobe, and a viscosity of 300 to 400 cps 1% Brookfield Viscosity (at 30 RPM, spindle #2) and hydroxyethylcellulose having 0.6 wt. % $C_{12}$ hydrophobe, 0.3 to 0.35 wt. % $C_{16}$ hydrophobe, and 300 to 400 cps 1% Brookfield Viscosity, wherein all weight percentages are based on the weight of the total polymer. The hydroxyethyl molar substitution (number of moles of hydroxyethyl unit per mole of anhydroglucose unit) of the hydroxyethylcellulose is not critical to paint performance.

The principal ingredients of water-soluble protective coating compositions per this invention are film-former latices selected from the group consisting of styrene-butadiene copolymers, vinyl acetate polymers and copolymers, and acrylic polymers and copolymers (the most preferred of which are acrylic and vinyl acetate—acrylic in the United States, and styrene acrylics and VeoVa acetate (also known a vinyl acetate-vinyl versatate) in Europe), opacifying pigments, dispersing agents and water-soluble protective colloids.

Typically, aqueous protective coating compositions contain, by weight of the total composition, from about 10% to about 50% of a latex, from about 10% to about 50% of an opacifying pigment (e.g., $TiO_2$, clay, calcium carbonate, silica, talc, etc.), from about 0.1% to about 2% of a dispersant/surfactant (e.g., polyacrylates, potassium tripolyphosphate, 2-amino-2-methyl-1-propanol, etc.) and from about 0.1% to about 1% of the polymers of this invention. Other common ingredients include defoamers, preservatives, surfactants, coalescing agents (e.g., glycols and glycol ethers, etc.), etc.

The invention is illustrated in the following examples, which are not intended to be limiting.

EXAMPLES 1-18

Aqueous solutions comprising 1%, by weight, of $C_8/C_{16}$ hydrophobe hydroxyethylcellulose (polymers identified in Table 1) were prepared by dissolving 1 g of the polymer in 99 g distilled water. Then, the 1% Brookfield Viscosity (at 30 rpm) of the solution was determined. The polymer compositions and viscosities are shown in the following Table 1.

TABLE 1

Aqueous Viscosity

| Sample | H.E.M.S. | % $C_8$ | % $C_{16}$ | Total | 1% Brookfield Viscosity at 30 rpm (CPS) |
|---|---|---|---|---|---|
| 1 (Invention) | 3.1 | 0.6 | 0.24 | 0.64 | 140 |
| 2 (Invention) | 3.1 | 0.4 | 0.28 | 0.68 | 86 |
| 3 (Comparison) | 3.6 | — | 0.72 | 0.72 | 385 |
| 4 (Invention) | 3.9 | 0.45 | 0.28 | 0.73 | 92 |
| 5 (Invention) | 3.5 | 0.5 | 0.26 | 0.76 | 54 |
| 6 (Invention) | 3.2 | 0.62 | 0.17 | 0.79 | 54 |
| 7 (Invention) | 3.9 | 0.65 | 0.26 | 0.91 | 100 |
| 8 (Comparison) | 3.6 | — | 1.00 | 1.00 | Insoluble |
| 9 (Invention) | 3.2 | 0.74 | 0.26 | 1.0 | 225 |
| 10 (Invention) | 3.2 | 0.85 | 0.35 | 1.20 | 200 |
| 11 (Invention) | 3.1 | 1.22 | 0.27 | 1.49 | 305 |
| 12 (Invention) | 4.0 | 1.0 | 0.62 | 1.62 | 5000 |
| 13 (Invention) | 3.1 | 1.3 | 0.46 | 1.76 | 2000 |
| 14 (Invention) | 3.3 | 1.7 | 0.17 | 1.87 | 415 |
| 15 (Comparison) | 3.3 | 1.9 | — | 1.9 | 98 |
| 16 (Invention) | 3.4 | 1.7 | 0.25 | 1.95 | 2520 |
| 17 (Invention) | 2.9 | 1.6 | 0.47 | 2.07 | 3340 |
| 18 (Invention) | 3.1 | 1.8 | 0.32 | 2.12 | 2700 |
| 19 (Invention) | 3.2 | 1.8 | 0.48 | 2.28 | 3120 |
| 20 (Comparison) | 3.3 | 1.5 | 0.9 | 2.4 | Insoluble |

[1]Hydroxyethyl molar substitution.
[2]Weight % $C_8$ hydrophobe, based on the weight of the polymer.
[3]Weight % $C_{16}$ hydrophobe, based on the weight of the polymer.
[4]Total weight % of $C_8$ and $C_{16}$ hydrophobe, based on the weight of the polymer.

The above results show that a polymer having 1 weight % $C_{16}$ polymer is not soluble in water (Sample 8. See also Sample 20.), whereas use of a mixed hydrophobe system permits preparation of water-soluble polymers having 1 or more weight % hydrophobe (Examples 9-14 and 16-19).

The use of a mixed hydrophobe system also gives the practitioner an added degree of rheology control than is obtained using a single hydrophobe. For instance, Sample 15 containing 1.9 weight % of a $C_8$ hydrophobe had a Brookfield viscosity of 98 cps, whereas Sample 14 having 1.7 weight % of a $C_8$ hydrophobe and 0.17% of a $C_{16}$ hydrophobe had a Brookfield viscosity of 415 cps and Sample 16 having 1.7 weight % of a $C_8$ hydrophobe and 0.25 weight % of a $C_{16}$ hydrophobe had a viscosity of 2520 cps.

Paints prepared with polymers having hydrophobic radicals have superior color development properties (change in color due to shear) as compared to the unmodified equivalents, e.g., hydroxyethyl cellulose. Further, longer hydrophobes provide superior color development properties as compared to shorter hydrophobes. However, there is a limit to the amount of long chain hydrophobe that can be incorporated to a polymer, i.e., if too much of a hydrophobe is introduced into a polymer the polymer becomes insoluble in water. The inventor has discovered that this solubility limitation can be overcome by use of a mixed hydrophobe system according to this invention and that paints containing mixed hyrdophobes have superior color development properties as compared to those prepared with single hydrophobes. Further, spatter resistance is dependent on hydrophobe substitution level (the specific level desired depends upon the degree of polymerization). Thus, the mixed hydrophobe systems enable the practitioner to use the proper level of hydrophobe substitution to obtain improved spatter resistance properties, without introducing color development problems.

EXAMPLES 21-22

An interior semi-gloss paint was prepared using Rhoplex AC-417 latex (Rohm and Haas Company, Philadelphia, Pa.). First, the following were mixed for 30 minutes at high speed with a Cowles blade:

TABLE 2

| Component | Parts (by weight) |
|---|---|
| Propylene Glycol | 140.00 |
| Tamol SG-1 dispersant[1] | 14.90 |
| Hercules SGL Defoamer[2] | 3.50 |
| Water | 43.75 |
| Tri-Pure R-900 pigment[3] | 420.00 |

TABLE 2-continued

| Component | Parts (by weight) |
| --- | --- |
| Silica 1160 extender pigment[4] | 43.75 |

[1]Available from Rhom & Haas Company, Philadelphia, PA.
[2]Available from Hercules Incorporated, Wilmington, DE.
[3]Available from E. I. du Pont de Nemours & Company, Inc., Wilmington, DE.
[4]Available from Illinois Minerals Company, Cairo, IL.

Then, the following were added and the batch was mixed for 30 minutes at reduced speed with a propeller blade:

TABLE 3

| Component | Parts (by weight) |
| --- | --- |
| Hercules SGL Defoamer[1] | 4.75 |
| Propylene Glycol | 17.50 |
| Texanol coalescing agent[2] | 37.80 |
| Super-Ad-It preservative[2] | 1.75 |
| Triton GR 7M surfactant[3] | 0.90 |
| Rhoplex AC-417 | 875.00 |

[1]Available from Hercules Incorporated, Wilmington, De.
[2]Available from Eastman Chemical Products, Kingsport, IN.
[3]Available from Rohm & Haas Company, Philadelphia, Pa.

The above base paint was then thickened to an initial viscosity shown in the following Table 4 with 297 total parts of (a) an aqueous thickener solution containing the polymer listed in Table 4 and (b) water.

Color development was measured by a subjective test, using the paint tinted with a thalo blue colorant. The color between a rubbed and unrubbed area of a test card was rated on a scale of 0 (no difference) to 4 (rubbed area very much darker).

To a ½ pint lined paint can, was added 98 grams of thickened paint and 2.0 grams of Colortrend® thalo blue colorant (Nuodex, Inc., Piscataway, N.J.). Then, the paint was shaken for 5 minutes using a Red Devil Shaker. Afterwards, using a 5 mil drawdown blade, a portion of the paint was drawn over a plain white chart, Form WB (available from the Leneta Company, Ho-Ho-Kus, N.J.). The bottom (unsealed) portion of the paint film was rubbed using a circular motion, until the film was tacky. This shows performance under high shear conditions. Three minutes later, the top (sealed-portion) was rubbed in the same manner. This shows performance under low shear conditions. The cards were hung to dry and, then, were evaluated for color difference, with the specification being based on the rating of the unsealed portion of the card.

TABLE 4

Peformance of Polymers in Latex Paint

| Example | % Hydrophobe | | | H.E.M.S. | Brookfield Viscosity[1] | % Thickener[2] | Paint Viscosity[3] | | Color Development Shear | |
| --- | --- | --- | --- | --- | --- | --- | --- | --- | --- | --- |
| | $C_8$ | $C_{16}$ | Total | | | | Initial | Overnight | Low | High |
| 21[4] | 0.85 | 0.35 | 1.20 | 3.2 | 200 | 0.34 | 94 | 102 | 1 | 1 |
| 22 (Comp.)[5] | — | 0.72 | 0.72 | 3.6 | 385 | 0.38 | 89 | 95 | 4 | 4 |
| | — | 1.00 | 1.00 | 3.6 | Insoluble | — | — | — | — | — |

[1]Brookfield Viscosity (centipose) in a 1 weight percent solution at 25° C.,at 30 rpm.
[2]Weight percent, based on the total weight of the paint.
[3]In Krebs Units, measured on a Stormer viscometer.
[4]Polymer of Example 10.
[5]Polymer of Example 3.
[6]Polymer of Example 8.

The data in Table 4 demonstrate that paints prepared with the polymers of this invention have superior color development properties to those prepared with polymers only having one $C_{16}$ hydrophobe. The polymer of Example 6 having 1% by weight of a $C_{16}$ hydrophobe is insoluble in water and, thus, is not useful in a latex paint. The polymer used in Example 22, having 0.72% by weight of a $C_{16}$ hydrophobe, is soluble in the water, but produces a paint with comparatively poor color development properties. In contrast, the paint of Example 21, prepared with a polymer having a mixed hydrophobe system per this invention (1.20% total hydrophobe), has superior color development properties to the paint of Example 22.

The polymers of this invention are useful as noted above and as stabilizers in emulsion polymerization, as protective colloids in suspension polymerization, as thickeners in cosmetics and shampoos, and as flocculants in mineral processing, etc.

While this invention has been described with respect to specific embodiments, it should be understood that these embodiments are not intended to be limiting and that many variations and modifications are possible without departing from the scope of this invention.

What I claim is:

1. A water-soluble, cellulose ether polymer having (a) at least one substituent selected from the group consisting of hydroxyethyl, hydroxypropyl, and methyl radicals and (b) two or more hydrophobic radicals having 6 to 20 carbon atoms selected from the group consisting of long chain alkyl, alphahydroxyalkyl, urethane, acyl 3-alkoxy-2-hydroxypropyl, wherein one of the hydrophobic radicals has a carbon chain length that is at least two carbon atoms longer than that of another of the hydrophobic radicals and the hydrophobic radicals are contained in a total amount of between about 0.2 weight percent and an amount such that the cellulose ethers are less than 1% by weight soluble in water.

2. The cellulose ether polymer of claim 1 wherein one of the hydrophobic radicals has a carbon chain length that is at least four carbon atoms longer than that of the other of the hydrophobic radicals.

3. The cellulose ether polymer of claim 1 which is anionic or nonionic.

4. The cellulose ether polymer of claim 1 which is nonionic.

5. The cellulose ether polymer of claim 1 wherein one of the hydrophobic radicals contains 12 or more carbon atoms.

6. The cellulose ether polymer of claim 1 wherein one of the hydrophobic radicals contains 15 or more carbon atoms.

7. The cellulose ether polymer of claim 1 wherein one of the hydrophobic radicals contains 8 or less carbon atoms.

8. The cellulose ether polymer of claim 5 wherein one of the hydrophobic radicals contains 8 or less carbon atoms.

9. The cellulose ether polymer of claim 1 wherein the polymer contains two hydrophobic radicals.

10. The cellulose ether polymer of claim 8 wherein the polymer contains two hydrophobic radicals.

11. The cellulose ether polymer of claim 2 which is nonionic or anionic.

12. The cellulose ether polymer of claim 2 which is nonionic.

13. The cellulose ether polymer of claim 10 which is nonionic.

14. The cellulose ether polymer of claim 1 wherein the polymer contains three hydrophobic radicals, each of which has at least two carbon atoms more or less than the others.

15. The cellulose ether polymer of claim 14 which is nonionic and wherein (a) one of the hydrophobic radicals contains 8 or less carbon atoms and (b) a second of the hydrophobic radicals contains 12 or more carbon atoms.

16. The cellulose ether of claim 1 wherein the substituent (a) is a hydroxyethyl radical.

17. The cellulose ether of claim 2 wherein the substituent (a) is a hydroxyethyl radical.

18. The cellulose ether of claim 13 wherein the substituent (a) is a hydroxyethyl radical.

19. The cellulose ether of claim 1 wherein the substituent (b) is an alkyl radical.

20. The cellulose ether of claim 18 wherein the substituent (b) is an alkyl radical.

21. The cellulose ether of claim 1 wherein the substituent (b) is a 3-alkoxy-2-hydroxypropyl radical.

22. The cellulose ether of claim 18 wherein the substituent (b) is a 3-alkoxy-2-hydroxypropyl radical.

23. The cellulose ether polymer of claim 6 wherein one of the hydrophobic radicals contains 8 or less carbon atoms.

* * * * *

UNITED STATES PATENT AND TRADEMARK OFFICE
CERTIFICATE OF CORRECTION

PATENT NO. : 4,904,772
DATED : February 27, 1990
INVENTOR(S) : SAU

It is certified that error appears in the above-identified patent and that said Letters Patent is hereby corrected as shown below:

(57) Abstract, " radials "

should read -- radicals --

Column 6, Line 21, " $C_{12}$) "

should read -- ($C_{12}$) --

Column 9, Table 4, Example Column, Third Line after "22"

should read -- $8^6$ --

Column 9, Line 67, " 6 "

should read -- 8 --

Signed and Sealed this

Ninth Day of July, 1991

*Attest:*

HARRY F. MANBECK, JR.

*Attesting Officer*   *Commissioner of Patents and Trademarks*